US005173095A

United States Patent [19]

Yasukawa et al.

[11] Patent Number: 5,173,095

[45] Date of Patent: Dec. 22, 1992

[54] EVAPORATIVE FUEL CONTROL CANISTER CONTAINING ABSORBENT SWELLING BY ABSORBING LIQUID FUEL

[75] Inventors: Masao Yasukawa, Okazaki; Tomohide Aoki, Gifu; Takashi Ohta, Nagoya, all of Japan

[73] Assignees: Toyota Jidosha Kabushiki Kaisha, Toyota; Toyota Gosei Kabushiki Kaisha, Inasawa; Kabushiki Kaisha Toyota Chuo Kenkyusho, Aichi, all of Japan

[21] Appl. No.: 757,524

[22] Filed: Sep. 11, 1991

[30] Foreign Application Priority Data

Sep. 12, 1990 [JP] Japan .................................. 2-241459

[51] Int. Cl.[5] .............................................. B01D 53/04

[52] U.S. Cl. ........................................ 55/316; 55/387; 123/519

[58] Field of Search ................................ 55/316, 387; 123/519-521

[56] References Cited

U.S. PATENT DOCUMENTS 4,403,587 9/1983 Mizuno et al. ...................... 123/519
4,684,382 8/1987 Abu-Isa ................................ 55/316
4,714,485 12/1987 Covert et al. ..................... 55/387 X
4,732,588 3/1988 Covert et al. .................. 123/519 X

FOREIGN PATENT DOCUMENTS 62-148765 9/1987 Japan .
62-265460 11/1987 Japan .
64-67222 3/1989 Japan .
1227861 9/1989 Japan .

*Primary Examiner*—Charles Hart
*Attorney, Agent, or Firm*—Oblon, Spivak, McClelland, Maier & Neustadt

[57] ABSTRACT

An evaporative fuel control canister for use in an internal combustion engine includes a canister main body having a vapor absorbing chamber and a liquid separate chamber. The vapor absorbing chamber has a first portion filled with a vapor absorbing material, and a second spatial portion. The liquid separate chamber has an expansible and contractible member containing a liquid absorbing material. The vapor absorbing chamber is adjacent to the liquid separate chamber in a ventilation state. The canister includes a vapor passage coupling a fuel tank and the liquid separate chamber, and a purge passage coupling the internal combustion engine and the liquid separate chamber. The purge passage has a first opening positioned in the expansible and contractible member, and a second opening positioned in the second spatial portion. The canister includes stopper members for maintaining a surface of the expansible and contractible member at a position which the extensible and contractible member does not reach the second opening so that the second spatial portion is always maintained.

8 Claims, 2 Drawing Sheets

EVAPORATIVE FUEL CONTROL CANISTER CONTAINING ABSORBENT SWELLING BY ABSORBING LIQUID FUEL

BACKGROUND OF THE INVENTION (1) Field of the Invention

The present invention generally relates to evaporative fuel control canisters, and more particularly to an evaporative fuel control canister containing an absorbent which swells by absorbing liquid fuel.

(2) Description of the Related Art

During a supply of fuel to a fuel tank in a vehicle equipped with an internal combustion engine, a large amount of fuel vapor evaporates. Even while the vehicle is traveling or stopping, some fuel in the fuel tank or a carburetor float chamber evaporates. In order to prevent leakage of fuel vapor to the atmosphere, an evaporative fuel control canister (hereafter simply referred to as a canister) filled with an absorbent is connected to the fuel tank.

A conventional canister is disclosed in Japanese Laid-Open Patent Publication No. 62-265460 (which corresponds to U.S. Patent Application S.N. 851,547 filed on Apr. 14, 1986). The canister disclosed in this document has an activated charcoal layer having an opening formed at an upper portion thereof and exposed to the atmosphere, and a liquid separate chamber at a lower portion thereof. A vapor passage and a purge passage are provided so that they penetrate the activated charcoal layer and are connected to the liquid separate chamber.

Another conventional canister is disclosed in Japanese Laid-Open Patent Publication No. 1-227861. The canister disclosed in this document has a liquid separate chamber at an upper portion thereof and an activated charcoal layer at a lower portion thereof. The liquid separate chamber is filled with particles of an organic polymer compound which serves as an absorbent liquid fuel.

However, conventional canisters as described above have a disadvantage in that the activated charcoal layer may be wet in a state where a certain amount of liquid fuel is collected in the liquid separate chamber by vibration of the vehicle, etc. Since the liquid fuel contains a large number of constituents having high boiling points, the activated charcoal degrades greatly when it comes into contact with the liquid fuel.

In order to eliminate the above-mentioned problem, it may be possible to fill the liquid separate chamber disclosed in Japanese Laid-Open Patent Publication No. 62-265460 with the absorbent disclosed in Japanese Laid-Open Patent Publication No. 1-227861. However, since the absorbent swells (increases in volume) by absorbing liquid fuel, the passage resistance of the absorbent in the liquid separate chamber increases due to liquid fuel absorption, so that the normal purging function cannot be obtained.

SUMMARY OF THE INVENTION

It is a general object of the present invention to provide an improved evaporative fuel control canister in which the above-mentioned disadvantages are eliminated.

A more specific object of the present invention is to provide an evaporative fuel control canister having an improved purge function.

The above-mentioned objects of the present invention are achieved by an evaporative fuel control canister for use in an internal combustion engine comprising: a canister main body having a vapor absorbing chamber and a liquid separate chamber, the vapor absorbing chamber having a first portion filled with a vapor absorbing material and a second spatial portion, the liquid separate chamber having an expansible and contractible member containing a liquid absorbing material, and the vapor absorbing chamber being adjacent to the liquid separate chamber in a ventilation state; a vapor passage coupling a fuel tank with the liquid separate chamber; a purge passage coupling the internal combustion engine with the liquid separate chamber, the purge passage having a first opening positioned in the expansible and contractible member, and a second opening positioned in said second spatial portion; and stopper means for maintaining a surface of the expansible and contractible member at a position where said expansible and contractible member does not reach the second opening so that said second spatial portion is always maintained.

The above-mentioned objects of the present invention are also achieved by an evaporative fuel control canister for use in an internal combustion engine comprising: a canister main body having a vapor absorbing chamber and a liquid separate chamber, the vapor absorbing chamber being filled with a vapor absorbing material, the liquid separate chamber having an expansible and contractible member containing a liquid absorbing material, and the vapor absorbing chamber being adjacent to the liquid separate chamber; a vapor passage coupling a fuel with and the liquid separate chamber; a purge passage coupling the internal combustion engine with the liquid separate chamber, the purge passage having a first opening positioned in the expansible and contractible member, and a second opening positioned above the expansible and contractible member; and means for always coupling the second opening with the vapor absorbing chamber so that a negative pressure generated in the internal combustion engine is always exerted on the vapor absorbing chamber.

In an embodiment described below, the vapor absorbing chamber is vertically adjacent to the liquid separate chamber. However, it is possible to position the vapor absorbing chamber and the liquid separate chamber so that they are adjacent to each other in a horizontal direction or other directions other than the vertical and horizontal directions.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Figure 1:
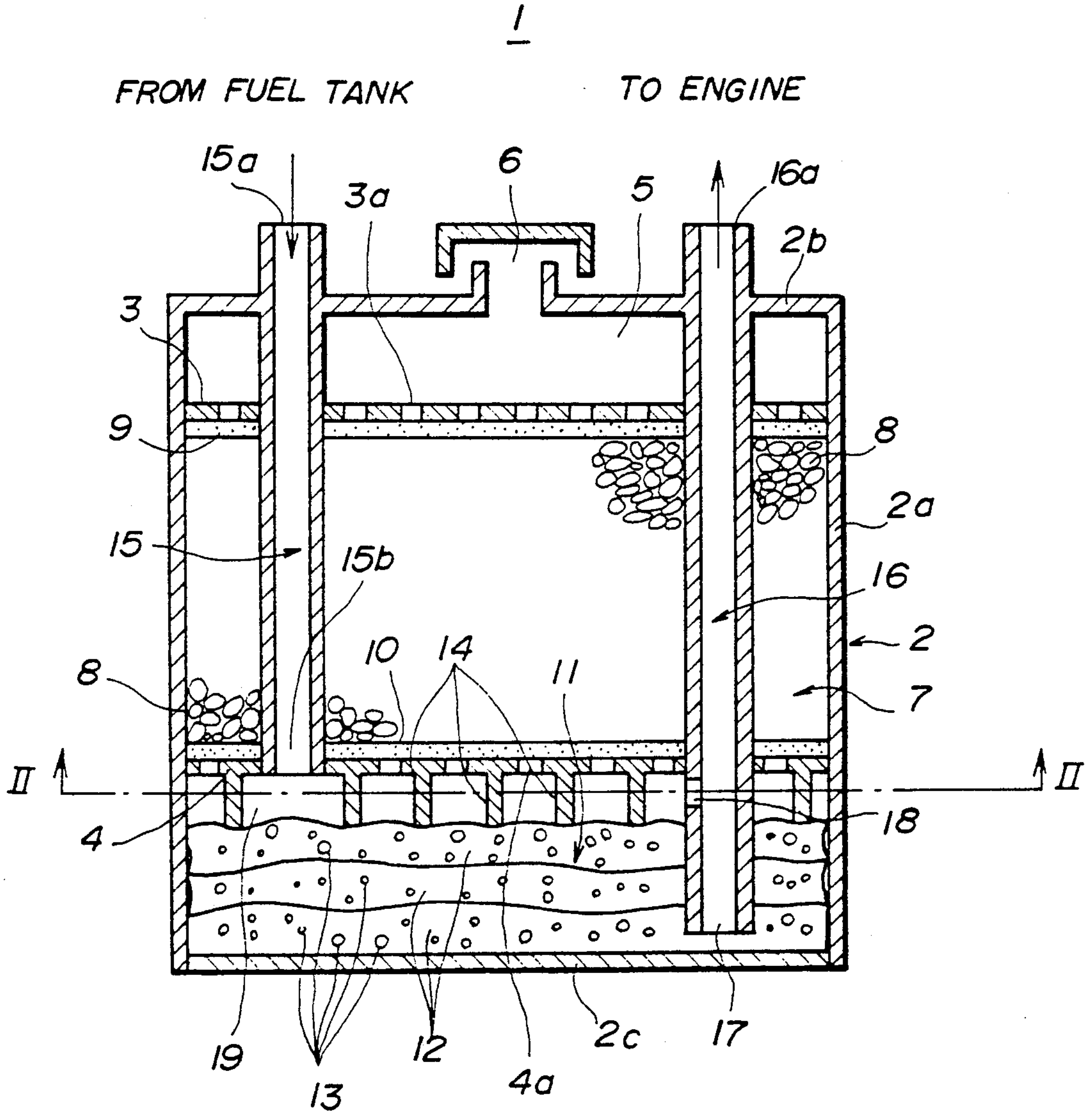
FIG. 1 is a cross-sectional view of an evaporative fuel control canister according to a preferred embodiment of the present invention.

FIG. 1 shows an evaporative fuel control canister 1 according to a preferred embodiment of the present invention. The canister 1 has a main body 2, which has a cylindrical housing portion 2*a*, a ceiling plate 2*b* and a bottom plate 2*c* and which has a substantially cylindrical shape. Two diaphragms 3 and 4 are provided in the canister main body 2 so that three chambers are defined inside thereof. A large number of air vents 3*a* and 4*a* are formed in the diaphragms 3 and 4, respectively, so that ventilation between a ventilation chamber 5 and an activated charcoal chamber 7 and ventilation between the activated charcoal chamber 7 and a liquid separate chamber 11 can be established.

The air ventilation chamber 5 is located at the top of the canister 1, and defined by the ceiling plate 2*b* and the diaphragm 3. An opening portion 6 coupling the air ventilation chamber 5 with the atmosphere is formed in the ceiling plate 2*b*.

The activated charcoal chamber 7 is defined by the diaphragms 3 and 4 and located at an intermediate portion of the canister 1. The activated charcoal chamber 7 has a first portion filled with particles 8 of activated charcoal, which absorb fuel vapor due to their absorbing function. Filters 9 and 10 are formed on inner surfaces of the diaphragms 3 and 4 in order to prevent leaking of the activated charcoal particles 8 to the outside of the activated charcoal chamber 7. The filters 9 and 10 pass the fuel vapor.

The liquid separate chamber 11 is located at a lower portion of the canister 1 and defined by the diaphragm 4 and the bottom plate 2*c*. A plurality of expansible and contractible members 12, such as mats, are stacked in the liquid separate chamber 11. Each of the mats 12 contains pieces 13 of an organic polymer compound which function as a liquid absorbent. The organic polymer compound is, for example, polypropylene or polyisoprene, as disclosed in Japanese Laid-Open Patent Application No. 64-67222, the disclosure of which is hereby incorporated by reference. Of course, it is possible for other materials to be used as the liquid absorbent. The organic polymer compound pieces 13 absorb liquid fuel and fuel vapor and hold them therein. As the organic polymer compound pieces 13 absorb liquid fuel and fuel vapor, they increase their volumes and swell. In response to this change, the mats 12 increase in volume.

The reason why the activated charcoal particles 8 and the organic polymer compound pieces 13 are used to absorb the liquid fuel and fuel vapor is that the absorbing ability of the activated charcoal particles 8 degrades when fuel containing high boiling point constituents comes into contact with the activated charcoal particles 8. The liquid fuel constituents which have been absorbed in the organic polymer compound pieces 13 are taken in a crosslinked structure thereof, so that it is not possible for the liquid fuel constituents to exist in the form of liquid. Thus, even if the canister main body 2 is damaged, the fuel cannot leak to the outside of the canister 1. Further, the activated charcoal particles 8 efficiently absorb low boiling point constituents of gasoline, and the organic polymer compound pieces 13 efficiently absorb liquid gasoline. By providing these different absorbents in the canister 1, it becomes impossible to degrade the absorbing ability of the canister arising from the phenomenon that the high boiling point constituents are absorbed in (or fixed with) the activated charcoal particles.

A plurality of rod-shaped stopper members 14 downwardly project from the diaphragm 4, and will be described in detail later. A vapor passage 15 and a purge passage 16 are provided in the canister main body 2, as shown in FIG. 1. More specifically, the vapor activated charcoal chamber 7, and are connected to the liquid separate chamber 11. The vapor passage 15 has an external opening 15*a* connected to a fuel tank (not shown), and an internal opening 15*b* located above the top of the stacked mats 12. The purge passage 16 has an external opening 16*a* connected to a purge port connected to an air intake system of an internal combustion engine. Further, the purge passage 16 has a first opening portion (hereafter referred to as a main opening) 17 and a second opening 18, both of which are located in the liquid separate chamber 11.

Figure 2:
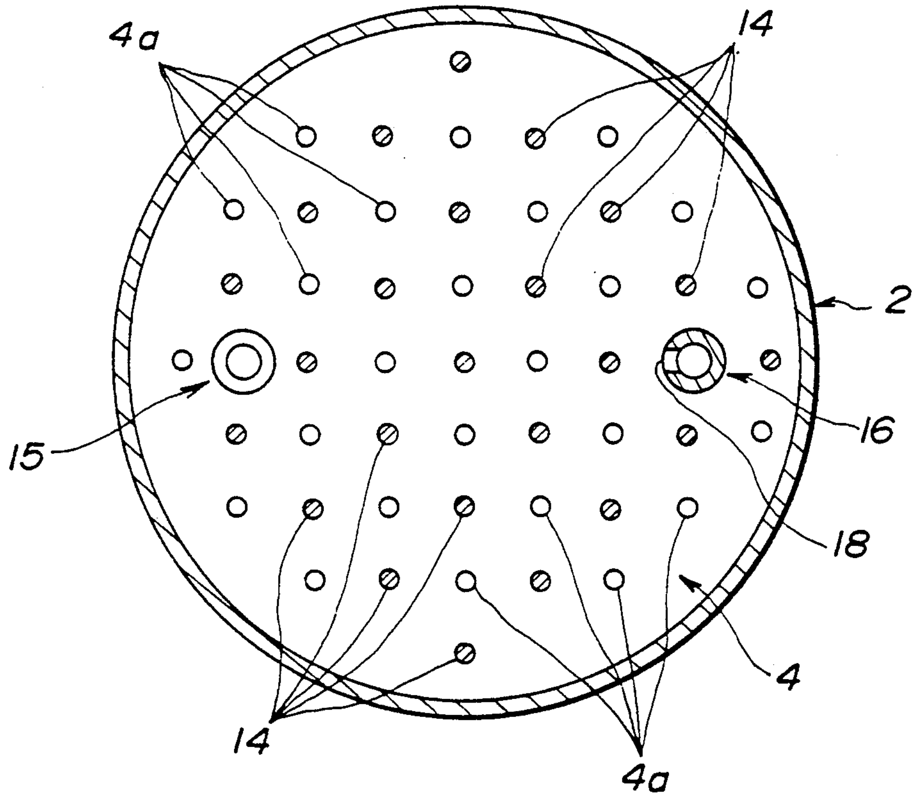
FIG. 2 is a cross-sectional view taken along line II—II shown in FIG. 1.

The main opening 17 is formed at a lower end of the purge passage 16 and close to the bottom plate 2*c*. Further, the main opening 17 of the purge passage 16 is located within the layer composed of the stacked mats 12. The second opening 18 (hereafter referred to as a bypass hole 18) has a diameter smaller than that of the main opening 17, and is formed at a portion of the purge passage 16 which is located in a spacing 19 formed above the top of the stacked mats 12. The bypass hole 18 connects the inside of the purge passage 16 to the spacing 19. The stopper members 14 are formed so that they extend downwardly beyond the position of the bypass hole 18. FIG. 2 is a cross-sectional view taken along line II—II shown in FIG. 1.

The operation of the canister 1 shown in FIG. 1 will now be described. First, a description will be given of a normal state where the liquid separate chamber 11 has not yet absorbed a large amount of liquid fuel.

In the normal state, the organic polymer compound pieces 13 have not yet swelled very much. Thus, each of the mats 12 has a small volume. In the normal state, the passage resistance of the mats 12 to the fuel vapor is small, so that the fuel vapor can easily pass through the mats 12. It should be noted that in the normal state, the top of the stacked mats 12 is spaced apart from the lower ends of the stopper members 14 (although not shown).

When the fuel vapor generated by the fuel evaporated in the fuel tank is introduced into the liquid separate chamber 11 via the vapor passage 15, liquid fuel is obtained. The liquefied fuel is absorbed in the stacked mats 12, and the remaining fuel vapor is absorbed in the activated charcoal particles 8 in the activated charcoal chamber 7. Air mixed in the evaporated fuel is not absorbed in the activated charcoal particles 8, but emitted to the outside of the canister 1 without being absorbed in the activated charcoal particles 8 via the opening portion 6 exposed to the atmosphere.

Meanwhile, while the vehicle is traveling, the fuel vapor absorbed in the canister 1 is supplied to the internal combustion engine, and burned therein. While the engine is working, a negative pressure generated by the engine is applied to the purge passage 16. Air is input to the canister 1 via the opening portion 6 due to the function of the negative pressure. The fuel vapor absorbed in the activated charcoal particles 8 is purged therefrom by the air input. Further, the liquid fuel absorbed in the organic polymer compound pieces 13 in the mats 12 is purged therefrom and changed to fuel vapor due to the function of the air input to the canister 1. This fuel vapor passes through the mats 12 and enters into the purge passage 16 via the main opening 17 since the passage resistance of the mats 12 is small. Then, the fuel vapor is introduced into the engine via the purge passage 16 and burned. In this way, the fuel absorbed in the canister 1 is discharged. During the above-mentioned operation, a small amount of fuel vapor purged from the activated charcoal particles 8 passes through the bypass hole 18 and enters into the purge passage 16.

A description will now be given of a swelled state where a large amount of liquid fuel has been absorbed in the liquid separate chamber 11 and the organic polymer compound pieces 13 have swelled. In the state where the organic polymer compound pieces 13 have swelled, the mats 12 have an increased resistance to the passage of the fuel vapor. Thus, it is difficult for the fuel vapor to pass through the mats 12, so that the main opening 17 of the purge passage 16 is substantially in a closed state.

Meanwhile, since each of the organic polymer compound pieces 13 has an increased volume in the swelled state, the level of the top of the stacked mats 12 has increased (mats 12 expand upwardly). However, the upward expansion of the stacked mats 12 is limited by engagement with the stopper members 14 which downwardly project from the diaphragm 4, so that the spacing 19 is definitely formed in an upper portion of the liquid separate chamber 11. FIG. 1 shows the swelled state where the spacing 19 is formed in the upper portion of the liquid separate chamber 11.

The length of each of the stopper members 14 is designed so that the lower ends thereof are located at a positional level lower than that of the bypass hole 18. Thus, the bypass hole 18 is continuously maintained exposed to the spacing 19 even in the swelled state. Thereby, the fuel vapor absorbed in the activated charcoal chamber 7 is purged due to the negative engine pressure continuously exerted thereon via the bypass passage 18, and enters into the spacing 19. After this, the fuel vapor bypasses the stacked mats 12 and is introduced into the purge passage 16 via the bypass hole 18. Then, the fuel vapor is introduced in the engine and burned.

As described above, it is possible to prevent a decrease in the amount of air introduced into the canister 1 via the opening portion 6 and ensure the ability to purge the fuel vapor absorbed in the activated charcoal particles 8 in the activated charcoal chamber 7 therefrom even when the passage resistance of the mats 12 due to the swelling of the organic polymer compound pieces 13 increases and thus the main opening 17 is substantially covered. In this way, the activated charcoal chamber 7 operates normally.

As has been described above, only the fuel vapor is purged from the activated charcoal chamber 7, while the liquid fuel absorbed in the organic polymer compound pieces 13 contained in the mats 12 is not purged. However, the ratio of the amount of the liquid fuel contained in the fuel entering into the canister 1 to that of the fuel vapor contained therein is not great. Thus, no problem will occur even when the purging from the organic polymer compound pieces 13 is temporarily stopped. The fuel constituents absorbed in the organic polymer compound pieces 13 that have swelled are evaporated while they are left as they are, so that the organic polymer compound pieces 13 will return to their original state.

Conventionally, there is a possibility that fuel drops will be directly transported to the engine during the purge operation. On the other hand, according to the above-mentioned embodiment of the present invention, the fuel drops definitely fall on the top of the stacked mats 12 due to the function of the stopper members 14. Thus, there is no possibility of the fuel drops being directly transported to the engine as described above. It should be noted that it is necessary to always exert negative pressure on the activated charcoal chamber 7.

The stopper members 14 are not limited to the specifically disclosed rod-shaped stopper members, and these members may have any shape which enables the top of the stacked mats 12 to be placed at a position lower than the bypass hole 18.

The organic polymer compound is not limited to being formed as pieces. As disclosed in Japanese Laid-Open Patent Publication No. 64-67222, the organic polymer compound contained in the mats 12 can be arbitrarily formed into, for example, powder, particles, or fibers. Further, it is possible to make the mats 12 of an appropriate organic polymer compound.

The present invention is not limited to the specifically disclosed embodiment, and variations and modifications may be made without departing from the scope of the invention.

What is claimed is:

1. An evaporative fuel control canister for use in an internal combustion engine, comprising:

a canister main body having a vapor absorbing chamber and a liquid separate chamber, said vapor absorbing chamber having a first portion filled with a vapor absorbing material and a second spatial portion, said liquid separate chamber having an expansible and contractible member containing a liquid absorbing material, and said vapor absorbing chamber being adjacent to said liquid separate chamber in a ventilation state;

a vapor passage coupling a fuel tank and said liquid separate chamber;

a purge passage coupling said internal combustion engine and said liquid separate chamber, said purge passage having a first opening positioned in said expansible and contractible member, and a second opening positioned in said second spatial portion; and stopper means for maintaining a surface of said expansible and contractible member at a position where said expansible and contractible member does not reach said second opening so that said second spatial portion is always maintained.

2. An evaporative fuel control canister as claimed in claim 1, wherein said stopper means comprises a plurality of projections which are provided in the liquid separate chamber and which presses said expansible and contractible member.

3. An evaporative fuel control canister as claimed in claim 2, wherein said projections have respective press ends which extend over said second opening.

4. An evaporative fuel control canister as claimed in claim 1, wherein said vapor passage has an opening end located in said spacing in said liquid separate chamber.

5. An evaporative fuel control canister as claimed in claim 1, wherein said first opening of the purge passage is located at a bottom portion of said expansible and contractible member.

6. An evaporative fuel control canister as claimed in claim 1, wherein said second opening has a diameter smaller than that of said first opening.

7. An evaporative fuel control canister as claimed in claim 2, wherein said projections are rod-shaped members.

8. An evaporative fuel control canister as claimed in claim 1, further comprising an air ventilation chamber formed in said canister main body and adjacent to said vapor absorbing chamber, said air ventilation chamber having an opening connected to the atmosphere.

* * * * *